July 4, 1967  A. F. HUBBARD  3,329,140
FLUID HEATER HAVING A HOT GAS CONDUIT
Filed Jan. 17, 1966  2 Sheets-Sheet 1

INVENTOR.
Arthur F. Hubbard

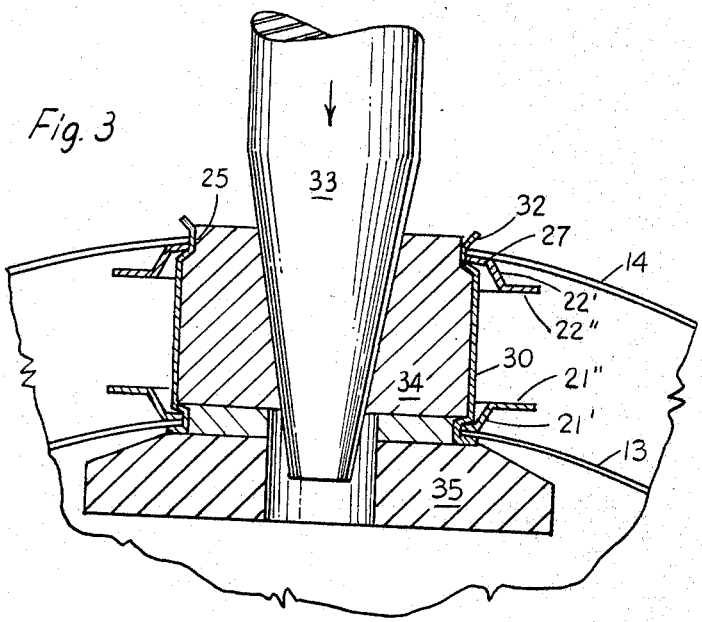
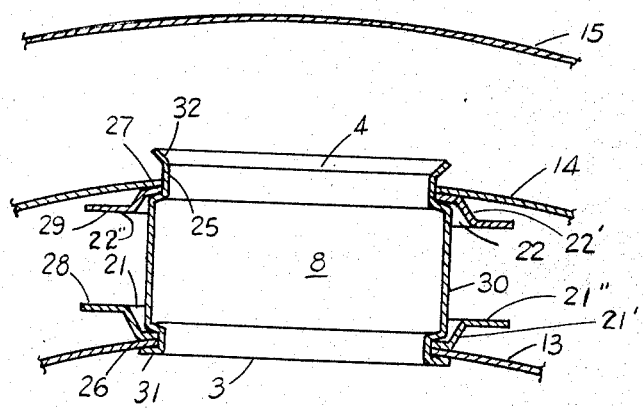

United States Patent Office 3,329,140
Patented July 4, 1967

3,329,140
FLUID HEATER HAVING A HOT GAS CONDUIT
Arthur F. Hubbard, Moline, Ill., assignor to American Air Filter Company, Inc., Louisville, Ky., a corporation of Delaware
Filed Jan. 17, 1966, Ser. No. 521,139
4 Claims. (Cl. 126—110)

ABSTRACT OF THE DISCLOSURE

A conduit arrangement to conduct hot gases from a combustor chamber to a cooperatively disposed heat exchange chamber which includes fin means in heat conductive relation with the joint between the conduit and one of the chambers.

Background of the invention

In previous fluid heaters of the type including a combustion chamber, heat exchanger, and a conduit for passing hot gas from the combustion chamber to the heat exchanger, frequent failure of the elements associated with conducting the hot gas have been noted. Such failure usually occurs where the hot gas conduit is joined to the combustion chamber or to the heat exchanger.

Summary of the invention

In accordance with the present invention, it has been recognized that the frequency at which failure of the elements of such heat exchangers occurs is significantly increased by localized overheating at the combustion chamber outlet, and the heat exchanger inlet. It has been further recognized that the localized heating occurs, in part, from excellent heat transfer conditions in these areas resulting from turbulent gas flow at the entrance to and exit from the hot gas conduit.

One object of the present invention is to provide an efficient means to prevent localized overheating of the gas conduit in a fluid heater, and particularly, to prevent overheating of the combustion chamber at the hot gas outlet, and the heat exchanger at the hot gas inlet.

A further object of the present invention is to prevent frequent failure of elements of such fluid heaters in the areas of the hot gas conduit. Furthermore, it is recognized that the economical, efficient, effective hot gas conduit of the present invention will also provide enhanced structural stability to the heat exchanger and combustion chamber where they are joined to the hot gas conduit.

Various other features of the present invention will become obvious to one skilled in the art upon reading the disclosure set forth hereinafter.

More particularly, the present invention provides in a fluid heating device of the type having a combustion chamber including a hot gas outlet and a heat exchanger including a hot gas inlet, an improved hot gas conduit to conduct hot gases from the combustion chamber to the heat exchanger, comprising: a tubular hot gas conduit having a first end communicatively connected with the hot gas outlet of the combustion chamber to form a first end joint, and a second end communicatively connected with the hot gas inlet of the heat exchanger to form a second end joint; and heat removal means extending from and disposed in contiguous, heat-conducting relation with the end joints to remove heat from the joints and portions of the combustion chamber, heat exchanger and hot gas conduit adjacent the joints.

It is to be understood that various changes can be made by one skilled in the art in the arrangement, form, and construction of the hot gas conduit disclosed herein without departing from the scope or spirit of the present invention.

Referring now to the drawings which show one advantageous embodiment of the present invention:

FIGURE 3 is a sectional view showing one method of forming a hot gas conduit in accordance with the present invention; and FIGURE 4 is a view taken along a plane passing through line 4—4 of FIGURE 1.

Figure 1:
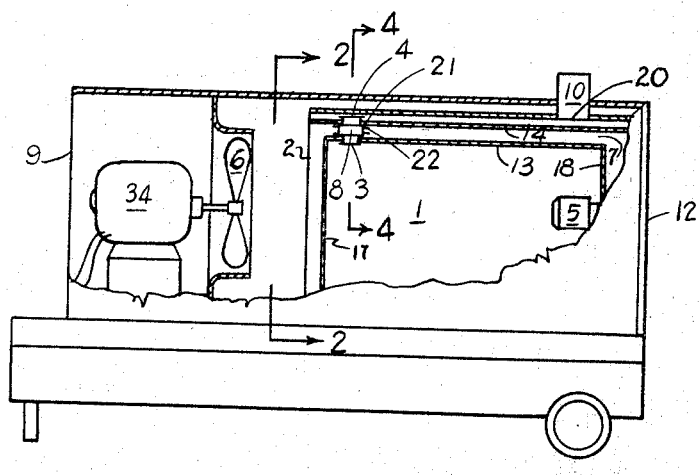
FIGURE 1 is a partially broken schematic view of a portable fluid heating device showing a hot gas conduit in accordance with the present invention.
Figure 2:
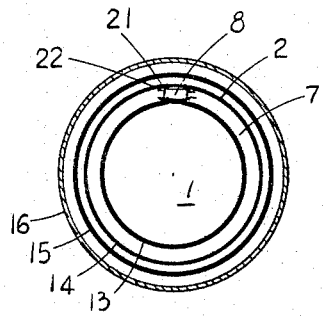
FIGURE 2 is a view taken in a plane passing through line 2—2 of FIGURE 1.

While the hot gas conduit of the present invention can be used in fluid heaters to heat any desired fluid, the fluid heater of the example of FIGURE 1 is adapted for use as an air heating device. In the example of an air heater shown in FIGURE 1, air is drawn into the heater through an air inlet 9 by fan 6 driven by motor 34. The heater includes combustion chamber 1 and a burner 5 to provide a source of heat for the heater. The hot combustion gases from burner 5 pass through hot gas conduit 8 to heat exchanger 2. Exhaust gases are vented from heat exchanger 2 by means of a vent stack 10. The heated air is then emitted from the heater through opening 12 into a space to be served by the heater.

Combustion chamber 1 is enclosed by wall 13 and end walls 17 and 18. Combustion air for burner 5 can be supplied by fan 6, driven by motor 34, through an auxiliary combustion air duct (not shown). Combustion chamber wall 13 includes hot gas outlet 3 to receive hot gas conduit 8 as hereinafter described.

It is to be understood that within the scope of the present invention, any desired combustion chamber-heat exchanger arrangement can be used; however, in the example of FIGURE 1, heat exchanger 2 surrounds combustion chamber 1 in spaced relation therefrom to form an annular opening 7 between combustion chamber 1 and heat exchanger 2. Heat exchanger 2 includes hot gas inlet 4 cooperatively disposed to receive hot gas conduit 8 as hereinafter described, and exhaust outlet 20 to pass exhaust gas to vent stack 10.

In accordance with the present invention and as can be seen more clearly in FIGURE 4 of the drawings, tubular hot gas conduit 8 is provided to pass combustion gases from combustion chamber 1 to heat exchanger 2. Hot gas conduit 8 includes fin 21 adjacent wall 13 of combustion chamber 1 at outlet 3 and fin 22 adjacent wall 14 of heat exchanger 2 at hot gas inlet 4. Fins 21 and 22 can, advantageously, be joined by any convenient means, for example, mechanical clamping, to hot gas conduit 8 and wall members 13 and 14 to form joints between ends of conduit 8 and outlet 3 and inlet 4, respectively. It is to be noted that fins 21 and 22 are dish-shaped, having angular side portions 21' and 22' respectively extending away from hot gas conduit 8 and terminal flat portions 21" and 22" respectively. Terminal portions 21" and 22" are thus located away from combustion chamber 13 and wall 14, respectively, to permit air flowing through annular opening 7 to fully flow over dish-shaped fins 21 and 22 to facilitate heat removal. Bottom portions 26 and 27, respectively, of dish-shaped fins 21 and 22 are in contiguous, heat-conductive relation with wall 14 of heat exchanger 2, and wall 13 of combustion chamber 1, respectively, to remove heat from conduit 8 and said walls by conduction to prevent localized overheating.

In one method of forming a hot gas conduit in accordance with the present invention, as shown in FIGURE 3, tubular member 8 of circular cross section, having an unexpanded diameter 25, can be inserted through hot gas outlet 3 of wall 13 and hot gas inlet 4 of wall 14 of heat exchanger 2. The diameters of outlet 3 and inlet 4 are, advantageously, only slightly larger than the diameter of conduit 8 to facilitate positioning conduit 8. Fin members 21 and 22 have cooperatively designed apertures to permit conduit 8 to be inserted through said fins after tubular member 8 has been inserted through outlet 3 but before insertion through inlet 4. Fins 21 and 22 are positioned on tubular member 8 so bottom portion 26 of fin 21 contacts wall 13 of combustion chamber 1 around the joint between conduit 8 and wall 13, and bottom portion 27 of fin 22 contacts wall 14 of heat exchanger 2 around the joint between conduit 8 and wall 14. Collar 31 which is of larger diameter than aperture 3 is provided on tubular conduit 8 to hold conduit 8 in position before expansion of tubular member 8.

In the example of FIGURE 3, collar 31 of tubular member 8 rests on a platen 35 between the platen and wall 13. Expandable die 34 is inserted in tubular member 8. Die 34 is advantageously expanded by driving plunger member 33 into a cooperative opening in expandable die 34 to expand tubular member 8 to form flared portion 32, and expanded portion 30. Expanded portion 30 clamps fins 21 and 22 in sealing, heat-conductive relation between portion 30 and wall members 13 and 14, respectively.

As hereinbefore described and with further reference to FIGURE 4, it will be noted that base portions 26 and 27 of dish-shaped fins 21 and 22 are clamped in contiguous, heat-conductive relation between walls 13 and 14, respectively, and expanded portion 30 of tubular member 8. It will be recognized that the clamped joint thus formed promotes heat transfer from conduit 8 and walls 13 and 14 to fins 21 and 22. It will be noted that the length of expanded portion 30 of tubular member 8 along the axis of tubular member 8 is, advantageously, approximately equal to the desired separation between wall 13 and wall 14, thus permitting tubular member 8 to serve as a spacer and further insuring the structural stability of the heater.

The invention claimed is:
1. In a fluid heating device of the type having a combustion chamber including a hot gas outlet, a heat exchanger including a hot gas inlet, and means to move a stream of fluid over said combustion chamber and said heat exchanger to heat said fluid, an improved means to conduct hot gases from said combustion chamber to said heat exchanger, comprising: a tubular hot gas conduit having a first and communicatively connected with said hot gas outlet of said combustion chamber to form a first end joint, said hot gas conduit having a second end communicatively connected with said hot gas inlet of said heat exchanger to form a second end joint; and heat removal means joined to said first end joint in heat conductive relation and extending radially outwardly from said tubular hot gas conduit in spaced relation from said combustion chamber.

2. The hot gas conduit of claim 1 including: heat removal means joined to said second end joint in heat conductive relation and extending radially outwardly from said tubular hot gas conduit in spaced relation from said heat exchanger.

3. The apparatus of claim 2 wherein said heat removal means includes first dish-shaped fin means and second dish-shaped fin means, said first and second dish-shaped fin means including a bottom portion, a side portion, and a terminal portion joined to said side portion, said first dish-shaped fin being disposed so said bottom portion is clamped in contiguous, heat-conductive relation between said tubular member and said combustion chamber at said first joint to conduct heat away from said first joint, and said side portion of said first fin extends away from said hot gas conduit and said combustion chamber to hold said terminal portion in spaced relation from said tubular member and said combustion chamber to permit flow of cooling air around said first fin; said second fin being disposed so said bottom portion is clamped in contiguous, heat-conductve relation between said tubular member and said heat exchanger at said second joint to conduct heat away from said second joint and said side portion of said second fin extends away from said hot gas conduit and said heat exchange device to hold said terminal portion in spaced relation from said tubular member and said combustion chamber to permit flow of cooling air around said second fin.

4. The apparatus of claim 3 wherein said tubular member includes radially expanded portions adjacent said first joint and said second joint to hold said combustion chamber and said heat exchanger in desired spaced relation on said tubular member.

References Cited

UNITED STATES PATENTS

| 350,590 | 10/1886 | Hood | 126—118 X |
| 2,401,502 | 6/1946 | Olds | 126—119 X |
| 2,776,541 | 1/1957 | Johnston | 126—116 X |

FOREIGN PATENTS

| 379,942 | 9/1923 | Germany. |

JAMES W. WESTHAVER, *Primary Examiner.*